March 5, 1968  S. J. HACHTMAN  3,371,626
CONFECTION MANUFACTURE
Filed Sept. 14, 1965  2 Sheets-Sheet 1

INVENTOR
SAMUEL J. HACHTMAN
BY Brown, Jackson,
Boettcher & Dienner
ATTORNEYS

March 5, 1968     S. J. HACHTMAN     3,371,626
CONFECTION MANUFACTURE
Filed Sept. 14, 1965     2 Sheets-Sheet 2
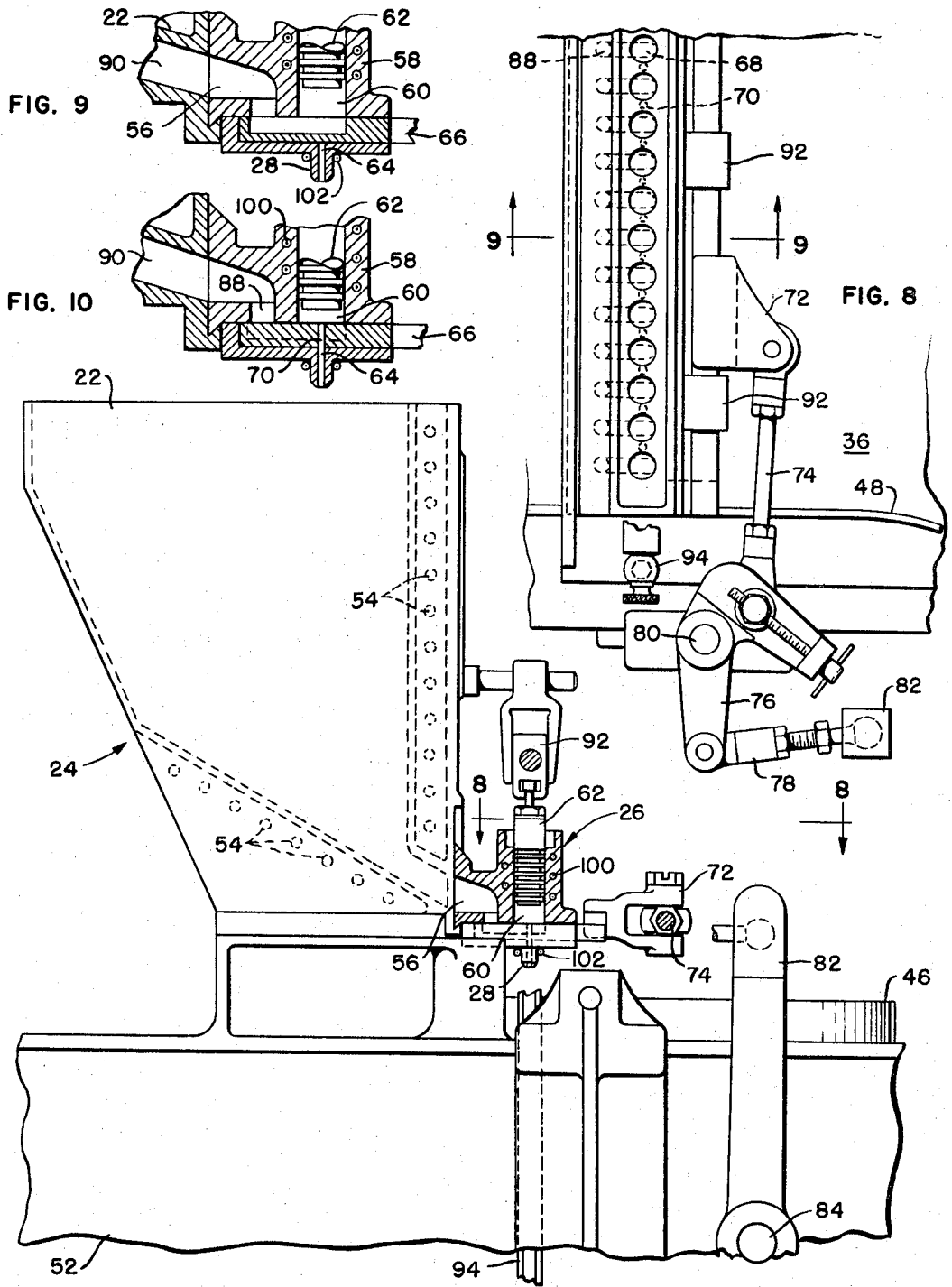
INVENTOR
SAMUEL J. HACHTMAN
BY Brown, Jackson,
Boettcher & Dienner
ATTORNEYS

[Column 1]

3,371,626
CONFECTION MANUFACTURE
Samuel J. Hachtman, River Forest, Ill., assignor to Sugarless Candy Corporation of America, Chicago, Ill., a corporation of Illinois
Filed Sept. 14, 1965, Ser. No. 487,232
12 Claims. (Cl. 107—19)

ABSTRACT OF THE DISCLOSURE

Method of making sugarless candy from an aqueous solution of sorbitol by first heating to evaporate the water therefrom and after the water content has been reduced, allowing the waterfree candy mixture to cool at a temperature which is below its melting point but above the temperature at which it starts to set. The process is then continued by depositing measured quantities of the heated sorbitol into thin-wall cavities of a plastic mold, the housing and nozzles of the depositor having thermostatically controlled heating elements which maintain the temperature of the sorbitol above the temperature at which it sets but below a temperature at which the plastic mold cavities would heat-deform. The thin walls of the cavities in the plastic mold are of irregular contour and arranged in spaced complementing relation to the walls of adjacent cavities to provide surrounding channels which permit free circulation of air between the cavities and accommodate rapid cooling and setting of the sorbitol candy.

---

This invention relates to novel means and method of manufacturing confections and more particularly candies made without sugar and free of starch.

The principal ingredient of this candy is sorbitol. Sorbitol is particularly suitable as a candy ingredient because of its close resemblance to sugar in terms of sweetness and nutritive values. Although technically speaking it is not a carbohydrate it metabolizes as a carbohydrate, but more slowly and has been found not to produce caries. These and other attributes of sorbitol make it particularly desirable as a candy that can be eaten by those required to observe dietary programs.

Sorbitol is conventionally available as a 70% aqueous solution having a viscosity of 110 cp. at approximately 25° C. In accordance with this invention such a solution is used to make candy by adding appropriate amounts of flavorants and colorants thereto and cooking the mixture at a temperature sufficiently high and long enough to eliminate most of the water and leave essentially pure sorbitol containing the added flavor and color imparting ingredients mixed therethrough. The mix is then poured into suitable mold cavities and put aside to cool and set until hard.

In the past, when molding candies such as starch and agar or jap jellies, it has been customary after cooking the mix to immediately pour the hot fluid candy mix into the depressions of starch molds. These molds are conventionally formed by level-filling four-sided trays with essentially dry starch and pressing mold impressions of desired shape into the top surface thereof to receive the hot candy mix. It was considered important to maintain the temperature of the starch molds near 130–140° F. and a moisture content of about 6%. After the hot candy mix had been poured into these impressions, the trays were stacked and set aside for at least twenty-four hours to allow time for the molded jelly candy pieces to cure. Afterwards, the contents of the trays would be deposited into a sieve through which the loose starch would pass for re-use in forming more starch trays and permit recovery of the molded candy pieces which would not pass through the mesh. Not only does the use of starch molds make the

[Column 2]

candy manufacturing process a slow and messy, dusty operation, but it is not at all satisfactory for molding sorbitol candy mix. Because the mix is poured into the starch depression while in a fluid state, it attracts starch particles which adhere to the molded candy pieces. The process therefore does not permit producing a candy which is free of starch.

Not only is it desirable that the sorbitol candies be free of all starch to accommodate dietary programs, but it has been found that the starch particles clinging to the exposed surface of the candy pieces mask the immediate flavor of the candy when placed in the mouth.

Thus it is a principal object of the present invention to provide novel means and method of molding heated candy mixes, and particularly sorbitol candy mixes which overcome these disadvantages and permit making a molded candy product free of starch clinging to the outer surfaces thereof.

In accordance with the invention, this and other objects are realized by depositing the candy mix into air-spaced thin-walled plastic mold cavities. Although any suitable thermo-plastic material that is inert and not otherwise subject to attack by the sorbitol or other candy mix being deposited into the cavities thereof may be utilized, I have found that polystyrene is particularly suitable. Polystyrene is not attacked by the sorbitol candy mix; it is readily available and can be readily and economically worked in relatively thin sheet form. Thus thin sheets of polystyrene may have pockets or cavities readily formed therein by pressure between heated dies or may be heated to near deformation state and drawn into the cavities of a vacuum type mold.

Aqueous solutions of sorbitol (70%) boil at about 221° F., and are preferably heated to near 300° F. to evaporate their water content. However, polystyrene reaches a heat distortion state near 190° F. and it is therefore important to allow the sorbitol candy mix to cool to a temperature below the heat distortion temperature range of the plastic mold before the sorbitol candy mix is deposited into its cavities. At the same time pure sorbitol melts at approximately 207° F. and at lower temperatures becomes relatively viscous.

I, however, have found that if the sorbitol candy mix is cooled to a temperature only slightly below that at which the polystyrene tends to distort with the application of pressure, for example, in the vicinity of 175–185° F., and maintained at said temperature that the candy mix is sufficiently fluid to be accommodated through conventional depositing apparatus and wherefore the plastic molds are useful to mold starch-free sorbitol candies.

Thus, it is a feature of the present invention that candies consisting essentially of sorbitol and minor amounts of texture, color and flavor imparting ingredients can be manufactured which are free of starch by heating the mix at an elevated temperature sufficient to remove substantially all the water content thereof and then cooling the mix to a temperature below the temperature at which the plastic molds heat deform, but sufficiently close to the melting temperature of the candy mix that it remains readily fluid, thereafter depositing measured quantities of the candy mixture into thin-walled cavities of plastic molds which conform the candy mix to required shape as they cool.

A further feature of the invention is that molded candy pieces are produced comprised essentially of sorbitol, plus flavorants, colorants and texture imparting ingredients, and completely free of starch and sugar.

One of the totally unexpected features and/or advantages derived from the practice of the present invention is the speeding up of the stacking or curing time required before candy deposited in the mold cavities is ready for packaging. Thus, the invention not only produces candy free of starch and without the dust, mess and general uncleanliness attendant to the use of starch trays and previously thought unavoidable in candy operations, but it has been found that the candy sets in the plastic mold cavities within approximately eight (8) hours as against the normally considered minimum period of twenty-four (24) hours. Although the explanation for this is not completely understood, it appears that this shortening of curing time derives in part from the fact that the fluid candy mix is deposited into thin-walled cavities, which are surrounded on all four sides by air passages having unobstructed communication with the ambient atmosphere so that each deposit has a maximum cooling exposure area. In addition, the walls of the cavities themselves are preferably given an irregular shape which serves first to give shape retention properties to the cavities and strength to the total mold even though pressed out of sheet stock which may be only 5 mils thick to start. It also further increases the surface area exposed to the ambient atmosphere. Starch molds are necessarily thick and although the starch itself may have a certain amount of porosity, the sidewalls of the trays occlude communication with the ambient atmosphere and are slower to release heat than the air surrounded thin walled cavities of the molds comprising the present invention. In addition the candy mix is already reduced to below the melting point of the sorbitol before it is deposited into the thin-walled mold cavities, although still in a readily fluid state.

Still another feature of the invention is that such plastic molds permit a much larger number of mold cavities in a given area. The plastic molds also can be manufactured considerably in advance and require no special preconditioning other than to be maintained at a temperature below their heat distortion temperature and of course to be kept clean.

Still another feature of the invention is that candy pieces may be displayed in the molds which formed them. Thus, in accordance with the present invention, it is not necessary that the molded candy pieces be separated from the molding tray as was necessary in the case of starch trays. Instead, as soon as the candy has sufficiently cooled, the mold and candy pieces still in their tray may be simply wrapped and packaged, the combination making a very attractive commercial item. It will be appreciated that the molds can be supplied in a variety of colors to either contrast or harmonize with the color of the candy molded in the cavities thereof.

Also, the candy pieces when set readily separate from the mold cavities, particularly when the sidewalls of the cavities are tapered slightly relative to each other. In this event, the molds are also reuseable.

Many other objects, advantages and/or features of the invention in method and apparatus will be apparent or will become so upon consideration of the preferred embodiments which will now be more completely described in connection with the accompanying drawings.

In said drawings;

FIGURE 7 is a fragmented vertical view partly in section of one form of depositor modified in accordance with the invention;

FIGURE 8 is a view taken along lines 8—8, looking in the direction indicated by the arrow of the apparatus illustrated by FIGURE 7;

FIGURE 9 is an enlarged sectional view taken along lines 9—9 of FIGURE 7, partially fragmented; and FIGURE 10 is a view generally similar to FIGURE 9 but showing the closure valve bar in its second position.

Figure 1:
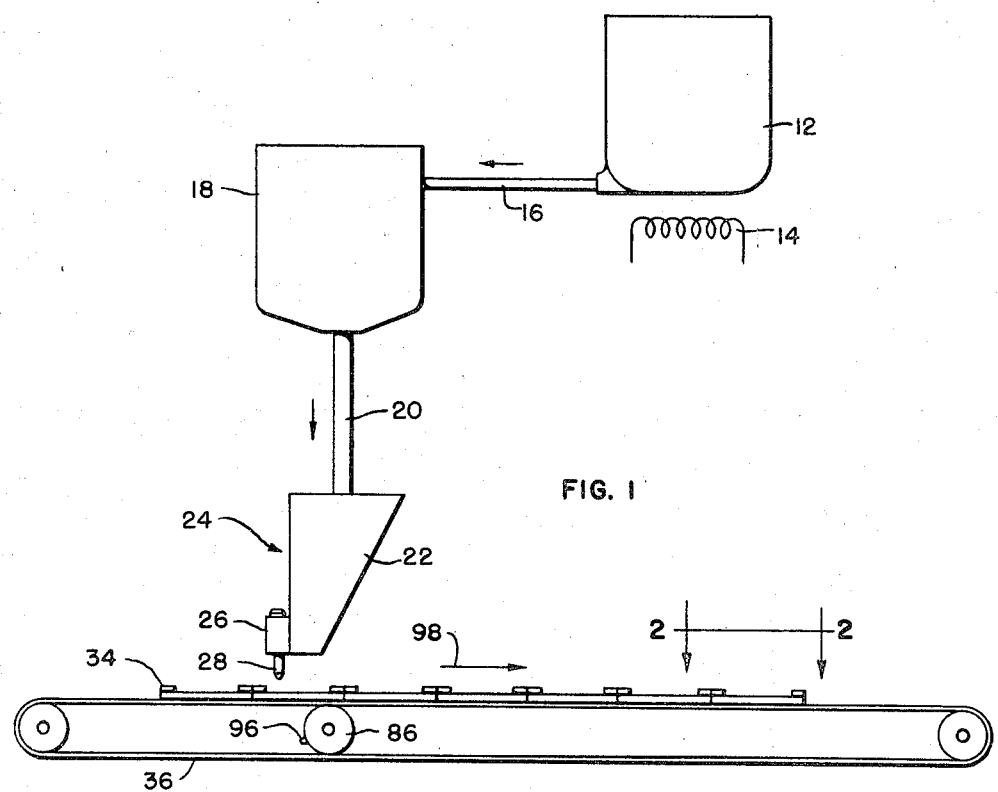
FIGURE 1 illustrates in schematic form apparatus suitable for the manufacture of candy in accordance with the present invention.

Referring, therefore, more particularly to the several views wherein like parts are identified by like reference numerals, and first to FIGURE 1, at 12 is a kettle into which the sorbitol candy mix is added and heated as by heater means 14. As already mentioned, the candy mix preferably comprises a 70% sorbitol aqueous solution which has a viscosity of 110 cp. at 77° F. and boils at about 220° F. Combined with the sorbitol aqueous solution, as with stirring, are desired amounts of U.S. certified colorants, natural fruit flavors, as well as other texture, color or flavor modifying ingredients such as gum Arabic, citric acid, manitol and glycerol. Any or all of these are selected and added in quantities in accordance with and to satisfy specific taste and visual requirements. No salt or sugar is added and the total amount of ingredients added to the sorbitol aqueous solution will usually comprise less than 10% by weight of the total mixture. The exact composition of the mix comprises no portion of the present invention although the invention does contemplate, in its preferred form, a candy comprising at least 90% sorbitol. The prepared candy mixture is heated in kettle 12 to above 220° F. and preferably in the vicinity of 280 to 290° F. and until the contents have been reduced in volume to indicate a mixture essentially free of water and comprising at least 90% sorbitol. This sorbitol candy mix is then passed through line 16 into a second kettle or vat 18 where it is cooled to a temperature just under 190° F. Thereafter, it is withdrawn via line 20 into hopper or reservoir 22 of a conventional candy depositing machine indicated generally at 24. At 26 the machine is shown provided with a depositor, which as will be shown later and more particularly described, has communication with the contents of hopper 22 and is adapted to deposit measured amounts of the heated candy mix through each of its nozzles 28 into the mold cavities 30 of plastic molds 32 (FIGURE 2) which are arranged on trays 34 and passed beneath said nozzles 28 by means of intermittently driven continuous belt 36.

Figure 2:
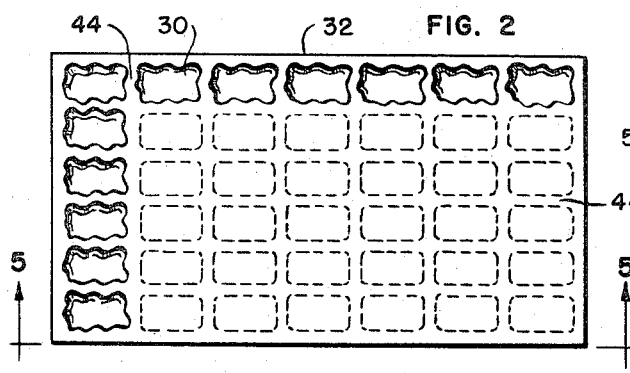
FIGURE 2 is a plan view of a plastic mold constructed and used in accordance with the invention.
Figure 3:
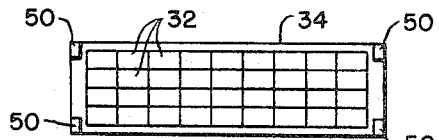
FIGURE 3 is a plan view showing a plurality of said candy molds mounted on a common tray.

Molds 32 may be formed of any suitably inert material. In its preferred form, molds 32 are formed from thin sheets of thermoplastic resin, such as polystyrene, having a uniform thickness of about 5 to 15 mils, each said molds 32 comprise equi-spaced parallel lines of similarly-spaced mold cavities 30 formed therein by heating the sheets to near their heat deforming temperature and evacuating selected portions thereof into appropriate molds, or by pressing the sheet between heated cooperating dies, each said cavities 30 having a surrounding planar web portion 38 by which they are integrally joined to each other. As illustrated by FIGURE 2, each said molds is generally rectangular in shape, so that they may be closely arranged on mounting tray 34, as illustrated in FIGURE 3, and so that their lines of cavities 30 may be in aligned relation. For example, as illustrated in FIGURE 2, each said molds 32 may comprise six parallel lines of seven cavities each or seven lines of six cavities each. Each of said cavities 30 is shaped to have an essentially planar bottom wall disposed generally parallel to web 38 by means of which each mold 32 can be stably supported on tray 34. Side walls 42 of each of said cavities 30 are of uniform height and, in their preferred form, slant inwardly at a small angle off perpendicular to the axis of the cavities. Said cavity sidewalls 42 also have a wall thickness substantially less than the wall thickness of the connecting web 38. The surrounding margins 46 of each of said molds 38 comprise a planar web such that when arranged in juxtaposed relation as indicated by FIGURE 3. An air passage also extends between the adjacent cavities at the edge of the molds and communicating with the ambient atmosphere at the edge of trays 34. The walls of said cavities may be essentially smooth and/or planar and also disposed perpendicular to their bottom wall 40. Preferably, however, said cavity side walls 42 are both inwardly inclined as shown best in FIGURE 6, and also provided with a generally irregular and preferably sinusoidal shape which complements the sinusoidal shape of the adjacent wall of the neighboring cavities 28. This permits close disposition and therefore a maximum number of cavities within a minimum area or size of mold and while also accommodating a maximum width of air passage or spacing 44 between each cavity. The irregular or sinuous shape of said side walls 42 not only adds strength and rigidity to the construction but also increases the surface area of the thin wall surrounding each portion of the candy mix deposited into the cavity 30. As illustrated, each of said cavities 30 is therefore completely surrounded by air spaces 44 disposed beneath connecting webs 38 and marginal flanges 46. These air spaces are in communication with each other to define a plurality of right-angularly disposed interconnected air passages which have communication with the ambient air outside the individual molds 32 and the trays 34 when the molds arranged thereon as shown by FIGURE 3. The candy deposits within each of the mold cavities 30 is thus provided with a maximum of surface area disposed to the surrounding ambient atmosphere to facilitate rapid cooling and setting of the deposited candy.

Figure 4:
FIGURE 4 shows several of said trays loaded with plastic molds which have been stacked to permit cooling and setting of the molded candies in the cavities of the molds.
Figure 5:
FIGURE 5 is a sectional view taken along lines 5—5 of FIGURE 2 to show further details in the construction of the candy plastic molds.
Figure 6:
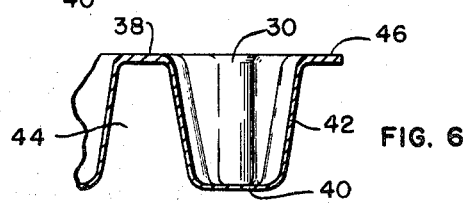
FIGURE 6 is a sectional view of said trays taken along lines 6—6 of FIGURE 5.

Trays 34 are preferably constructed of wood or other suitable and durable material and are of a width which permits close arrangement of a plurality of plastic molds and preferably to provide lines of mold cavities each having a number corresponding to the number of nozzles 28 of the depositor 26 beneath which they are directed by belt 36. It will be understood that cavities 30 and nozzles 28 will be so spaced that in the movement of trays 34 beneath the depositor each cavity of each line thereof will be aligned with the respective one of nozzles 28. Machine 24 is also provided with a pair of guides, one of which is shown at 48 in FIGURE 7, with which the opposed sides of the trays 34 engages the movement to position beneath nozzles 28, thereby assuring that the mold cavities are accurately aligned beneath respective nozzles. Each said trays 34 is also provided with appropriately located spacer elements 50 which extend to a height higher than the plastic molds 32 positioned thereon. This permits stacking of the mold-loaded trays as indicated in FIGURE 4 and providing a space between to accommodate circulation of ambient air. When stored at room temperature it has been found that the candy is ready for discharge from the molds and may be individually wrapped after about eight hours. As indicated in FIGURE 6, the side walls of the cavities 30 are preferably inclined toward each other. This has been found to facilitate ready separation of the candy pieces from the mold cavities as when the molds are turned face down and their bottom walls 40 lightly tapped.

Referring now to FIGURES 7 through 10, the illustrated machine 24 used for depositing measured amounts of the heated sorbitol candy mix is of generally conventional construction, except insofar as its hopper 22 and depositor 26 are provided with means for maintaining them at an exact temperature as more specifically delineated below. As shown in FIGURE 7, such a machine will comprise a hopper 22 having an open top through which the candy mix after having been heated and then cooled to a temperature below that at which the plastic molds 32 deform under the application of slight pressure is added. Hopper 22 is supported on a frame indicated generally at 42, which straddles intermittently driven continuous belt 36. Provided in the bottom and side walls of the hopper are heating coils 54 thermostatically controlled to maintain the sorbitol candy mix in a readily fluid flowable state, and at a temperature which is also below the temperature at which the plastic molds 32 distort. Preferably, hopper 22 is heated thereby to a temperature in the range of 175 to 180° F. Machine 24 will also have a depositor indicated generally at 26, which in FIGURE 7 is illustrated as attached to the base of the forward wall of the hopper and extending across the width thereof, its hollow 56 communicating with the heated interior of the hopper. Depositor 26 serves to deposit pre-measured amounts of candy mix from hopper 22 through its nozzles 28 into each of the mold cavities 30 respectively aligned therebeneath as obtained by the intermittent movement of continuous belt 36. Although the invention is not limited to a particular construction of depositor, one such is shown by FIGURES 7–10 for purposes of illustration. This depositor comprises a main housing 58, having a plurality of equally spaced vertical bores 60 in each of which a plunger 62 is mounted for reciprocal vertical movement. Each said bore 60 and its plunger 62 is aligned with and communicates through an opening 64 with a respective nozzle 28. At 66 is illustrated a closure member slidably mounted within the depositor body 58 between nozzles 28 and bores 60. As shown best in FIGURE 8, when considered with FIGURES 9 and 10, closure member 66 contains a plurality of transversely extending channels 68 on its upper side which are spaced apart a distance corresponding to the spacing of nozzles 28, and also have openings 70 intermediately disposed between each said channel 68. As shown in FIGURE 8, closure member 66 is operatively connected to slide member 72 so that it may be reciprocated to and fro in response to the action of linkage comprising arms 74, 76 and 78. As shown arm 76 is therefore pivoted to frame 52 at 80 and turns about a vertical axis under the reciprocal swinging of lever 82 to the upper end of which adjustable link arm 78 is connected by a ball and socket connection. Lever 82 is in turn pivotally mounted to frame 52 as at 84 so as to swing about a horizontal axis disposed below the plane of the top run of the conveyor belt 36. Preferably it is actuated by cam means (not shown) associated with drive wheel 86 (FIGURE 1) which intermittently drive belt 36. In the position of slide member 72, shown in FIGURE 8, channels 68 of said closure member 66 communicate at one end through aligned apertures 88 with hollow 56, the latter as aforementioned communicating with the interior of reservoir 22 by slotted entrance 90. This position of closure member 66 is illustrated by FIGURE 9. As there shown, closure 66 overlies aperture 64 and plunger 62 is at the top of its stroke. Accordingly, there is no communication between bore 60 and nozzle 28, wherefore bore 60 can fill with the candy mix to a height limited by the position of the plunger 62. In this position opening 70 of the closure member between the channel 68 are out of alignment with bores 60 and nozzles 28. Once bores 60 fill with candy mix, slide member 72 is moved by means of lever 82 through the continued rotation of drive wheel 86 to a second position closer to its guide support 92. In this second position of the closure member 66 its channels 68 are out of alignment with openings 88 and plunger bores 60. Instead its openings 70 align with bores 60 and apertures 64, as illustrated by FIGURE 10. As this occurs, means also under the control of drive wheel 86 cause plunger 60 to start downwardly and effect discharge of the candy mix from bore 70 to respective nozzles 28 into the mold cavities 30 and aligned therebeneath. Vertical reciprocation of plungers 62 is illustrated in FIGURES 7 and 8 as obtained by means of a common connector 92 which is connected at one end to the upper end of vertically reciprocal column 94. It will be appreciated, therefore, that the sequence of operation is such that as projection 96 on drive wheel 86 (FIGURE 1) engages belt 36 to move it forwardly in the direction indicated by arrow 98 it also simultaneously moves columnar shaft 94 upwardly causing plungers 62 to rise within their respective bores 60. By the time the plungers have reached the top of their stroke, projection 96 on drive wheel 86 has become disengaged from belt 36, temporarily halting advance of the trays 34. The distance through which the belt moves corresponds to the center-to-center spacing of the mold cavities 30, thereby permitting moving one line of mold cavities 30 out of alignment beneath nozzles 28 and bringing in the next line of cavities into alignment beneath the nozzles. Simultaneously, closure 66 is also moved to the position illustrated by FIGURES 8 and 9, where its channels 68 effectively align with plunger bores 60 and openings 84, the rise of plungers 62 effectively acting as pumps to draw the heated candy mix from reservoir 22 through entrance 90, hollow 56, openings 88 and channels 68 into the respective bores 60. During this time openings 70 are out of alignment with bores 60 and apertures 64. The continued rotation of drive wheels 86, however, subsequently rocks lever 82 in the opposite direction and causing closure member to return to the position illustrated by FIGURE 10, closing off communication of bores 60 with the reservoir 22 and causing its openings 70 to become aligned with said bores 60 and therefore permit discharge of the candy mix through the nozzles 28 into the aligned mold cavities beneath. At the same time drive wheel 86 also effects lowering of columnar shaft 94 and thereby plunger 62. Projections 96 are so spaced about the periphery of drive wheel 86 as to reengage belt 36 at the end of the down stroke of the plungers 62 to continue the filling operations. It will be appreciated also that the connection between columnar shaft 94 and connector 92 can be adjusted to vary the height to which the plungers 62 rise in their bores 60 and thereby constitute means by which the amount of candy mix being deposited into each mold cavity may be varied. Link arms 74, 76 and 78 are also made adjustable in order to permit or obtain the required alignments of channels 68 and the intermediately located apertures 70 with bores 60 and described above.

As thus described, depositor 26 represents a conventionally available candy depositing machine. However, as distinguished from conventional depositors, depositor 26 in accordance with the present invention is also provided with thermostatically controlled heating elements indicated at 100 and 102, 100 being disposed adjacent bore 60 and 102 adjacent nozzles 28. Heating elements 100 and 102 serve to maintain the walls of the bores 60 and nozzles 28 at a temperature sufficiently high that the candy mix will not set therein, but will remain fluid and readily flow therethrough. At the same time the candy mix will not be heated to a temperature so high that the candy mix, as it is deposited into the mold cavities, will distort the walls thereof or otherwise damage the molds 32. Preferably, heating elements 100 and 102 will be cast within the body of the depositor 26 and its nozzles 28, although they may also be simply wrapped thereabout or secured to the outer walls of the respective depositor and nozzles.

It will thus be apparent that all the recited objects, advantages and features of the invention have been demonstrated as obtainable in a convenient and entirely practical manner. It will be further appreciated that the aforesaid description is not to be taken in a limiting sense, but merely as descriptive of preferred embodiments and wherefore many changes, as well as rearrangements and/or omission of parts of the illustrated apparatus and steps of the described method may be had within the keeping of the spirit of the invention as described and the same being set forth in the appended claims.

Thus having described the invention, I claim:

1. A process for making sugarless candy comprising the steps of heating a candy mixture consisting essentially of sorbitol dissolved in water to a temperature above that at which the sorbitol melts and sufficiently high to permit evaporation of the water, continuing to heat the solution until the water has been reduced to a desired level, thereafter depositing measured quantities of the sorbitol into thin-walled cavities of a plastic mold while maintaining the temperature of the sorbitol above the temperature at which it sets and below a temperature at which the plastic-mold cavity walls will heat-deform, the thin walls of said cavities being spaced from the walls of adjacent cavities so as to provide channels about the cavities which communicate with the ambient atmosphere to permit free circulation of air between the sorbitol filled cavities and effect rapid cooling and setting of the sorbitol in said cavities.

2. A process for making sugarless candy comprising the steps of heating a candy mixture consisting essentially of sorbitol in water and containing minor amounts of flavor and color imparting ingredients to a temperature at which the water will evaporate therefrom, continuing said heating until a desired proportion of the water has been removed, thereafter allowing the water-freed candy mixture to cool to a temperature below its melting point and above the temperature at which it starts to set, thereafter depositing measured quantities of the candy mixture into thin-walled cavities of a plastic mold while maintaining the temperature of the candy mixture above the temperature at which it sets and below a temperature at which the plastic-mold cavity walls will heat-deform, the thin walls of said cavities being of irregular contour and spaced from the walls of adjacent cavities so as to permit free circulation of air between the candy mixture filled cavities and rapid cooling and setting of the candy mixture in said cavities.

3. The process for making sugarless candy claimed in claim 2, wherein after setting the candy pieces are removed from the mold cavities and individually wrapped.

4. The process for making sugarless candy claimed in claim 2, wherein after setting the molds including candy pieces in the cavities are packaged as a unit for distribution and sale.

5. A process for making sugarless candy comprising the steps of heating a candy mixture consisting essentially of sorbitol in water and containing less than 10% by weight of other ingredients including flavorants and colorants to a temperature above 221° F. and until the water has been substantially eliminated, allowing the water-freed candy mixture to cool to a temperature below 190° F., thereafter depositing measured quantities of the candy mixture into thin-walled cavities of a plastic mold while maintaining the temperature of the candy mixture near 175° to 185° F. to accommodate free flowing of the candy mixture while avoiding deformation of the plastic mold cavity walls, the thin walls of said cavities being of irregular contour and spaced from the walls of adjacent cavities so as to permit free circulation of air between the candy mixture filled cavities and rapid cooling and setting of the candy mixture in said cavities.

6. A process for making candy by depositing the candy into thin walled plastic mold cavities comprising the steps of cooking a candy mixture at a temperature above that at which the plastic mold cavities will readily deform, thereafter allowing the candy mixture to cool and depositing measured quantities of the candy mixture into thin-walled cavities of the plastic mold while maintaining the candy mixture at a temperature where it will readily flow and below said temperature at which the plastic-mold cavity walls will heat-deform, the thin walls of said cavities being of irregular contour and spaced from the walls of adjacent cavities so as to define channels therebetween and about said cavities having communication with the ambient atmosphere so as to permit circulation of air between the candy mixture filled cavities and effect rapid cooling and setting of the candy mixture in said cavities.

7. In apparatus for manufacturing sorbital candies to a predetermined size and shape, a heated hopper for storing the sorbital candy in a fluid readily flowable state, a plastic mold having parallel lines of spaced cavities of required shape, a depositor associated with said hopper, including a housing having a plurality of nozzles arranged in a line, feed means for intermittently moving said mold to successively align each line of its cavities beneath said nozzles, said plastic mold cavities having relatively thin walls which are heat deformable at a temperature above that at which the sorbitol candy becomes fluid, heating means associated with the housing and nozzles, said depositor maintaining its housing and nozzles at a temperature which is sufficiently high that the sorbitol candy remains fluid therein and sufficiently low that said mold cavities will not distort when heated by the fluid candy deposited therein from the nozzles, the depositor housing further including means adapted to discharge predetermined amounts of the candy through each nozzle into respective cavities of the plastic mold as they are aligned therebeneath.

8. A candy tray in which candy heated to a fluid state may be molded and when set packaged for distribution and sale comprising a thin sheet of thermoplastic material having parallel lines of closely spaced heat deformed cavities spaced apart and united by an integral continuous planar web extending about each cavity, said web providing interconnected lines of air spaces between and completely surrounding each said cavities, the walls of each said cavities being thinner than the surrounding planar web, each cavity having a substantially flat bottom wall and sidewalls which complement the shape of the next adjacent cavity sidewall, said thermoplastic material being inert to attack by the candy, capable of retaining its heat deformed shape when contacted by the heated fluid candy molded therein, and having a surface from which the candy can be readily separated after setting.

9. A candy tray in which candy heated to a fluid state may be molded and when set packaged for distribution and sale comprising a thin sheet of thermoplastic material having parallel lines of closely spaced heat deformed cavities spaced apart by an integral continuous planar web extending about each cavity and providing interconnected lines of air spaces between and completely surrounding each said cavities, each cavity having a substantially flat bottom wall and irregular shaped sidewalls which complement the shape of the next adjacent cavity sidewall affording rigidity to the cavities while increasing the surface area contacted by the fluid candy deposited therein to promote the setting thereof and permitting a maximum number of spaced cavities in a limited area, said thermoplastic material being inert to attack by the candy and capable of retaining its heat-deformed shape when contacted by the heated fluid candy molded therein.

10. A candy tray in which candy heated to a fluid state may be molded and when set packaged for distribution and sale comprising a thin sheet of thermoplastic material having parallel lines of closely spaced heat deformed cavities spaced apart by an integral continuous planar web extending about each cavity and providing interconnected lines of air space between and completely surrounding said cavities, each cavity having a substantially flat bottom wall and sinuous shaped sidewalls which complement the sinuous shape of the next adjacent cavity sidewall affording rigidity to the cavities while increasing the surface area contacted by the fluid candy deposited therein to promote the setting thereof and also permitting a maximum number of spaced cavities in a limited area, said thermoplastic material being inert to attack by the candy, capable of retaining its heat deformed shape when contacted by the heated fluid candy molded therein, and having a surface from which the candy can be readily separated after setting.

11. A candy tray as claimed in claim 10 wherein the sidewalls of each cavity are also inclined inwardly toward each other.

12. A candy tray as claimed in claim 10 comprised of polystyrene.

References Cited
UNITED STATES PATENTS

| | | | |
|---|---|---|---|
| 2,111,365 | 3/1938 | Jensen | 107—19 |
| 2,928,747 | 3/1960 | Nowlin | 99—134 |
| 3,048,128 | 8/1962 | Warren et al. | 107—27 X |
| 3,054,679 | 9/1962 | Bradford | 99—171 |
| 3,114,642 | 12/1963 | Meisel | 99—134 |

WALTER A. SCHEEL, *Primary Examiner.*

J. SHEA, *Assistant Examiner.*